United States Patent [19]

Kimura et al.

[11] 4,231,649
[45] Nov. 4, 1980

[54] VIEWFINDER DISPLAY IN A SINGLE LENS REFLEX CAMERA

[75] Inventors: Makoto Kimura; Yutaka Iizuka, both of Tokyo, Japan

[73] Assignee: Nippon Kogaku K.K., Tokyo, Japan

[21] Appl. No.: 44,975

[22] Filed: Jun. 4, 1979

Related U.S. Application Data

[63] Continuation-in-part of Ser. No. 949,265, Oct. 6, 1978, abandoned.

[30] Foreign Application Priority Data

Oct. 8, 1977 [JP] Japan ................... 52/134765[U]

[51] Int. Cl.³ .................. G03B 13/02; G03B 17/20
[52] U.S. Cl. ........................ 354/224; 354/54; 354/288; 354/289; 354/225
[58] Field of Search ............... 354/75, 76, 152, 155, 354/198–201, 219, 224, 225, 288, 289, 295, 53–55

[56] References Cited

U.S. PATENT DOCUMENTS

| | | | |
|---|---|---|---|
| 3,094,911 | 6/1963 | Reiche et al. | 354/54 |
| 3,583,300 | 6/1971 | Johnson et al. | 354/219 |
| 3,678,836 | 7/1972 | Dietz | 354/53 X |
| 3,828,644 | 8/1974 | Uchida | 354/54 |
| 4,005,441 | 1/1977 | Shimomura | 354/23 R |
| 4,118,722 | 10/1978 | Matsui | 354/155 |
| 4,118,723 | 10/1978 | Yamazaki et al. | 354/155 |

Primary Examiner—L. T. Hix
Assistant Examiner—William B. Perkey
Attorney, Agent, or Firm—Shapiro and Shapiro

[57] ABSTRACT

A single lens reflex camera body comprises a projected portion provided in the front face of the camera body between a mounting portion of the camera body to which a photographic lens is mounted and a viewfinder mounted to the camera body, and display means provided in the projected portion. The display means is capable of being viewed through the viewfinder mounted to the camera body.

9 Claims, 7 Drawing Figures

VIEWFINDER DISPLAY IN A SINGLE LENS REFLEX CAMERA

This is a contination-in-part of application Ser. No. 949,265, filed Oct. 6, 1978, now abandoned.

BACKGROUND OF THE INVENTION

1. Field of the Invention

This invention relates to a display device in a single lens reflex camera.

2. Description of the Prior Art

The prior art single lens reflex cameras of the interchangeable finder type have been such that a display element is disposed adjacent to the focusing screen within the camera body to display exposure information or that a display element is disposed within the housing of the pentaprism. In the former type, the light from both the focusing screen and the display member are received by the underside of the pentaprism and therefore the pentaprism must necessarily be large. In the latter type, a display member must be disposed in each of the various interchangeable finders.

SUMMARY OF THE INVENTION

It is an object of the present invention to provide a display device in a single lens reflex camera of the interchangeable finder type which overcomes the above-noted disadvantages.

The invention will become more fully apparent from the following detailed description of embodiments thereof taken in conjunction with the accompanying drawings.

DESCRIPTION OF THE PREFERRED EMBODIMENTS

Figure 1:
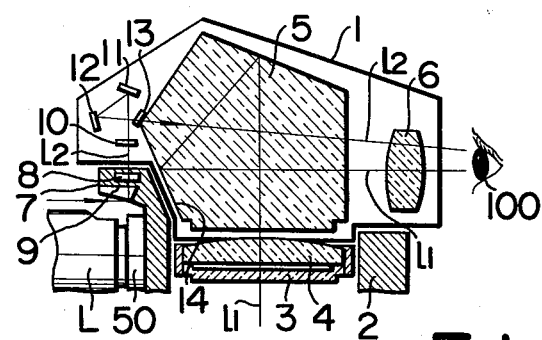
FIG. 1 is a cross-sectional view of a first embodiment of the present invention.

FIG. 1 is a cross-sectional view showing an embodiment using an eye-level finder having a pentaprism as a viewfinder.

An eye-level finder housing 1 is removable from a mirror box 2 which is a part of the camera body. Light $L_1$ passed through an objective lens (not shown) in an objective lens barrel L (partly shown) and reflected by a jump or guide return mirror is passed through a focusing screen 3 and a condenser lens 4, reflected by a pentaprism 5 and directed to an eyepiece 6. In the present embodiment, the focusing screen 3, the condenser lens 4, the pentaprism 5 and the eyepiece 6 together constitute a viewfinder optical system.

Figure 3:
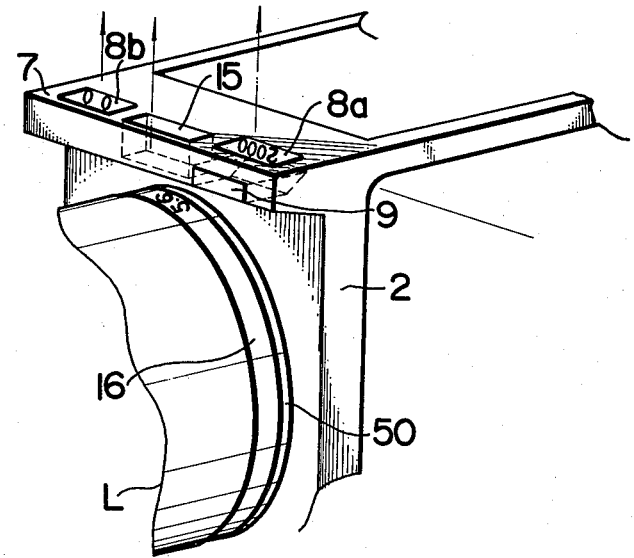
FIG. 3 is a perspective view of the first embodiment in which the viewfinder is removed.

Between a camera body mounting portion 50 for mounting the objective lens barrel L, and the housing 1, a projected portion 7 is secured to the upper portion of the front face of the mirror box 2. This projected portion, as shown in FIG. 3, extends laterally over a substantial distance. Referring to FIG. 1 again, an optical display member 8 such as light-emitting diode or light transmitting liquid crystal device or element is contained within the projected portion 7, and is connected so as to be driven by the output from an electrical circuit such as the metering circuit contained within the mirror box, as shown, for example, in U.S. Pat. No. 4,005,441, issued Jan. 25, 1977, and assigned to the same assignee as the present invention. This display member 8 displays shutter speed, and proper exposure, overexposure or under-exposure. If the display member 8 disposed at such position is a display element such as liquid crystal device which requires illumination, then a light guide 9, for example of glass or plastic, for guiding extraneous light to the display element 8 may be provided at the projected portion below the display member 8.

Now, the light $L_2$ from the display member 8 enters into eye-level finder housing 1 and passes through a concave lens 10 for magnification adjustment and is reflected by two mirrors 11, 12, and then passes through a convex lens 13 and enters into the pentaprism 5 through the upper portion of a second reflecting surface of the pentaprism 5.

Figure 2:
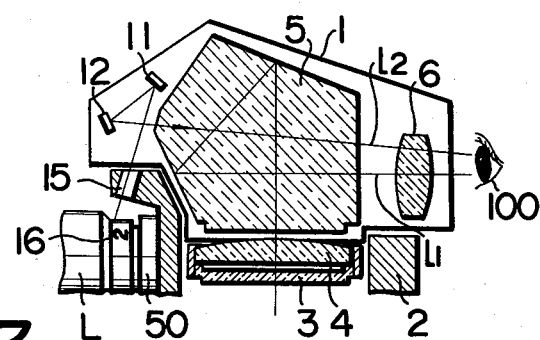
FIG. 2 is a cross-sectional view of the first embodiment taken along a different plane.

Also, as shown in FIG. 2, a through-hole 15 is formed in the projected portion 7 adjacent to the display member 8 and is opposed to an aperture value scale provided on the aperture ring 16 of the lens barrel L. Again in this case, the mirrors 11 and 12 may serve to permit observation of the aperture value scale.

FIG. 3 shows a specific example of the construction of the display member 8 and the through-hole 15. In this example, the display member 8 comprises a transmitting type liquid crystal device 8a for displaying shutter speed, and two light-emitting diodes 8b for displaying whether or not the exposure is proper. These display elements 8a and 8b are located on the opposite sides of the through-hole 15 positioned centrally in the projected portion 7. The light guide 9 is located below the liquid crystal element 8a.

Figure 4:
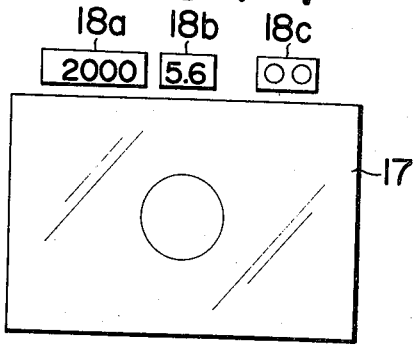
FIG. 4 is a view showing the finder view field of the first embodiment.

With such a construction, when a viewer 100 looks into the eyepiece 6, three display windows 18a, 18b and 18c may be viewed outside the viewfinder field 17 as shown in FIG. 4. The display window 18a displays shutter speed by means of the liquid crystal element 8a; the display window 18b displays the aperture value scale of the lens barrel L; and the display window 18c displays whether or not the exposure is proper by means of the light-emitting diodes 8b. Of course, the display of aperture value may be effected by an aperture value display element provided in the projected portion 7 instead of the aperture scale on the lens barrel, as is done for the shutter speed display.

Figure 5:
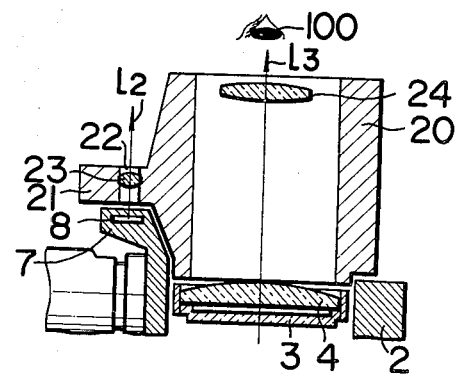
FIG. 5 is a cross-sectional view of a second embodiment of the present invention.

FIG. 5 is a cross-sectional view showing an embodiment using a waist-level finder 20 or a high-magnification finder as the viewfinder. In this case, the light $L_3$ reflected by the jump mirror travels in a direction substantially perpendicular to the optical axis of the objective lens and passes through the focusing screen 3 and the condenser lens 4 to the eyepiece 24. An opening 22 is provided in the front projection 21 of the waist-level finder housing 20 to enable the display member 8 to be observed directly from above it. It is also possible to make the observation easier by providing an enlarging optical system 23 in the opening 22. In FIG. 5, the light paths $L_2$ and $L_3$ become substantially parallel.

Figure 6:
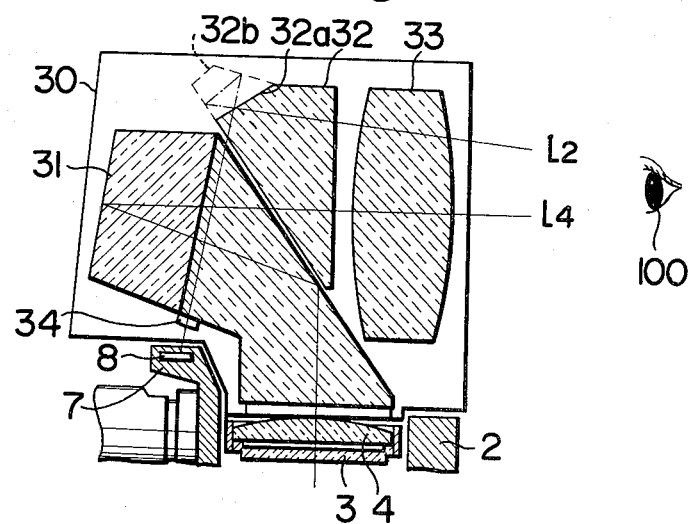
FIG. 6 is a cross-sectional view of a third embodiment of the present invention.

FIG. 6 shows an embodiment using a viewfinder system 30 which enables the eye 100 to observe the finder view field even if the eye is sufficiently spaced apart from the eyepiece 33. It comprises a modified pentaprism 31, a convex lens 34 for the display member 8, a prism 32 and an eyepiece 33. The object image may be viewed by the viewer 100 through the light path shown by $L_4$. On the other hand, the display member 8 in the projected portion 7 may be viewed by the viewer 100 through the light path shown by $L_2$. Also, a prism 32b may be provided as required, so that the image of the display member 8 may be twice inverted by the surface of this prism.

The display member 8 is not limited to a light-emitting diode or a liquid crystal element, but it may for example be a light-transmitting film printed with shutter speeds and aperture values. In this letter case, an illumination window 9 as shown in FIG. 1 becomes necessary.

Also, the display member 8 is provided in the projected portion 7 projected from the camera body and therefore it is important to cover the display member 8 with a portion of the finder housing, as shown, so that the operator may not inadvertently touch the display member 8 and so that dust or the like may not be deposited on the display member 8.

It is also preferable, in order to protect the projected portion, that the fore end of the projection 7 not be projected beyond the finder housing which covers the display member.

Figure 7:
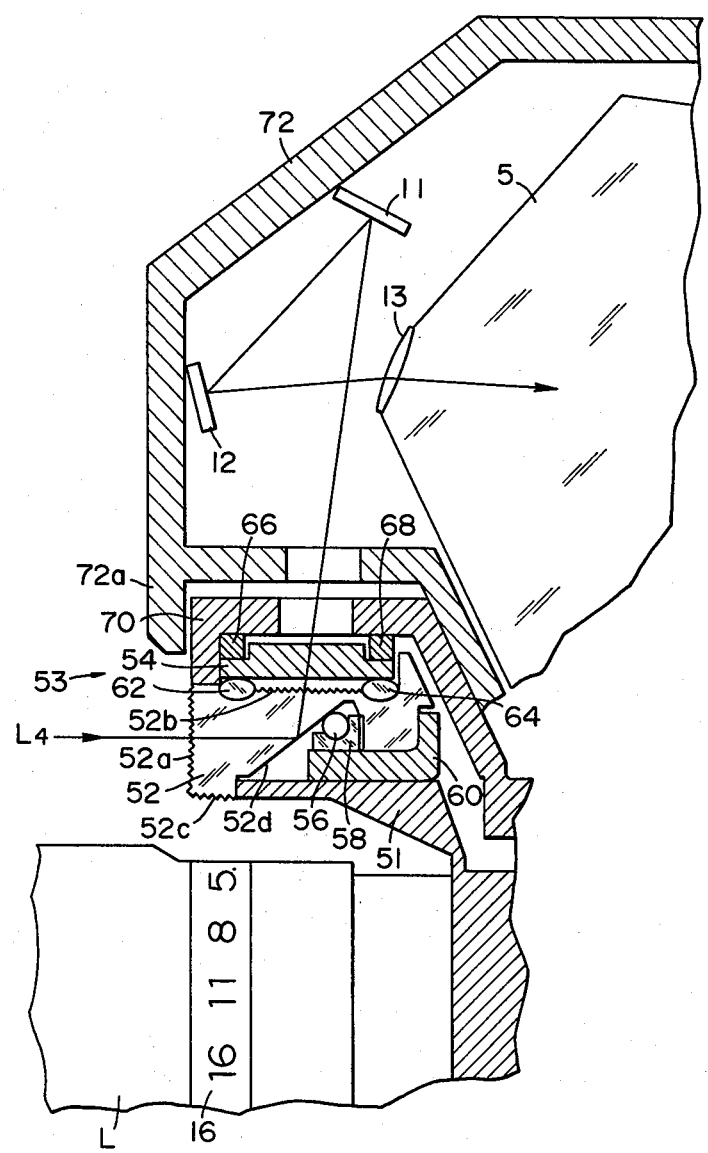
FIG. 7 is a cross-sectional view of a fourth embodiment of the invention.

In dark ambient light conditions, it is sometimes difficult to observe an aperture value scale on the aperture ring 16 and the display member 8 in a viewfinder. To overcome this defect, another embodiment wherein one lamp is used to illuminate both the aperture value scale and display member 8 is illustrated in FIG. 7. In this figure, a lower portion 51 of a projected portion 53 secured to a camera body supports a light guide 52. The light guide 52 is in the same position as the light guide 9 in FIG. 3 and is provided with matted surface 52a through which ambient light enters, a matted surface 52b which is opposite to a light transmitting display device 54, such as a liquid crystal, a matted surface 52c for illuminating the aperture value scale on the aperture ring 16, and a total reflection surface 52d by which the ambient light $L_4$ entering the light guide is totally reflected to the light transmitting liquid crystal device 54. The total reflection surface 52d is tilted at about 45° with respect to the axis of the aperture ring 16. A lamp 56 is provided in the space below the total reflection surface 52d. The lamp is supported by a lamp holder 58 which is transparent and secured to a member 60 supported by the lower portion 51 of the projected portion 53.

Cushioning rubbers 62, 64, which are transparent, are received in recesses or grooves which are formed on the upper surface of the light guide 52. The liquid crystal device 54 is supported between the transparent cushioning rubbers 62, 64 and elastic materials 66, 68. The upper portion 70 of the projected portion 53 is secured to the camera body. The interior structure of the finder housing 72, which is the same as in FIG. 1, consists of mirrors 11, 12, lens 13 and pentaprism 5. The lower end 72a of the housing 72 extends downwards as illustrated in FIG. 7 to cover the front of the upper portion 70 of the projected portion 53 and both sides thereof. This prevents penetration of dust or the like between the upper surface of the upper portion 70 and the lower end 72a of the housing 72.

With this structure, the light from the outside enters the light guide 52 through the surface 52a and is totally reflected by the total reflection surface 52d to exit from the surface 52b for illuminating the liquid crystal device 54. The aperture scale on the ring 16 is also illuminated by the ambient light and is observed in a viewfinder through a hole such as the through-hole 15 clearly shown in FIG. 3.

Where the ambient light is dark, lamp 56 may be turned on. The light from the lamp 56 passes through the total reflection surface 52d to illuminate the light transmitting device 54 and to partially emit from the surface 52c, so that aperture scale positioned diagonally beneath the surface 52c is illuminated.

It is noted that the surface 52b, which is preferably a matted surface, compensates for illumination irregularity of the ambient light and illumination irregularity of the lamp so that uniform illumination is applied to the light transmitting device 54. If, for example, the user's fingers operating the aperture ring 16 cross in the front of the surface 52a, it would result in the illumination irregularity of the device. To prevent this, the surface 52a is also preferably formed with a matted surface. Further, surface 52c, also matted, serves to illuminate the aperture scale positioned diagonally beneath the matted surface.

In this embodiment, the lamp 56 is positioned in the space below the total reflection surface 52d. Therefore, compact structure is attained. The cushioning rubbers are received in the recesses of the light guide and are transparent, so that the ambient light coming through the light guide 52 to illuminate the device 54 is not interrupted.

According to the present invention, as has hitherto been described, the information in the display member on the camera body side can be viewed through various types of interchangeable viewfinders. Also, the front upper portion of the mirror box provides a space having a lateral width and therefore it is possible to sufficiently secure a space for display means for other various types of information by using light emitting diodes or the like. It is also possible to display the display member in the upper portion of the view field as shown in FIG. 4. The wide space of the projected portion is particularly effective when use is made of a digital display element, such as a segment display device whose size cannot be reduced.

While these preferred embodiments of the invention have been shown and described, it will be apparent to those skilled in the art that changes can be made in these embodiments without departing from the principles and spirit of the invention, the scope of which is defined in the appended claims.

What we claim is:

1. A single lens reflex camera body to which a viewfinder system can be removably mounted, comprising:

a projected portion provided in the front face of the camera body between a mounting portion of the camera body on which a photographic lens is mounted and a viewfinder mounted on the camera body; and display means provided in said projected portion, said display means being capable of being viewed through a viewfinder mounted on the camera body, and wherein said projected portion includes illumination means for illuminating said display means, and said display means is a light transmitting display element located between said illumination means and said viewfinder.

2. A single lens reflex camera body according to claim 1 wherein said projected portion has a light transmitting portion for enabling a mark provided on a photographic lens barrel located below the projected portion to be viewed through a viewfinder mounted on the camera body.

3. A single lens reflex camera body according to claim 2, wherein said light transmitting portion is located substantially centrally in said projected portion, and said display means has display members located on opposite sides of said light transmitting portion.

4. A single lens reflex camera according to claim 1, wherein said illumination means includes a lamp, first means for directing light from said lamp toward said light transmitting display element and second means for directing light from said lamp toward a mark on a lens barrel located below said projected portion.

5. A single lens reflex camera body to which a viewfinder system is mounted, comprising:
a projected portion provided in the front face of the camera body between the mounting portion of the camera body to which a photographic lens is mounted and said view-finder;
a light transmitting display element provided in said projected portion, said display element being capable of being viewed through the viewfinder;
illumination means provided in said projected portion and between said display element and said photographic lens, said illumination means including a lamp and a light guide having an incident surface on which ambient light is incident, a first exiting surface opposed to said display element and an inclined surface for totally reflecting the light passing through said incident surface toward said first exiting surface to illuminate said display element, said lamp being located adjacent to said inclined surface so that the light from said lamp enters said light guide through said inclined surface in the direction of said first exiting surface, to thereby illuminate said display element.

6. A single lens reflex camera according to claim 5, wherein said incident and first exiting surfaces are matted.

7. A single lens reflex camera according to claim 5 or 6 wherein said photographic lens barrel is mounted below said projected portion and said projected portion includes a light transmitting portion for enabling a mark provided on said photographic lens barrel to be viewed through the viewfinder, and wherein said light guide has a second exiting surface facing said lens barrel, said second exiting surface directing the light which enters said light guide through said inclined surface from said lamp toward said lens barrel for illumination of said mark.

8. A single lens reflex camera according to claim 7 wherein said second exiting surface is matted.

9. A single lens reflex camera according to claim 5 further comprising a transparent cushioning member on which said display element is supported, said cushioning member being located in a groove adjacent to said first exiting surface of said light guide.

* * * * *